United States Patent Office 3,480,647
Patented Nov. 25, 1969

3,480,647
2-ACYLIMINO-1,3-OXATHIOLANES AND PROCESS FOR THEIR PRODUCTION
Roland Feinauer, Haltern, Karl Hamann, Leonberg, and Manfred Jacobi, Dusseldorf-Gerresheim, Germany, assignors to Chemische Werke Huls Aktiengesellschaft, Marl, Germany, a corporation of Germany
No Drawing. Filed Apr. 1, 1966, Ser. No. 539,328
Claims priority, application Germany, Apr. 10, 1965, C 35,561
Int. Cl. C07d 89/06
U.S. Cl. 260—327         12 Claims

ABSTRACT OF THE DISCLOSURE

A 2-carbacylimino-1, 3-oxathiolane compound is producible by heating, for some hours, at a temperature within the range 90–200° C., a mixture of approximately one mol of an acyl mustard oil of the formula $$R-\underset{\underset{O}{\|}}{C}-N=C=S$$

in which R is a lower aliphatic or cycloaliphatic or aromatic group with from 0.5 to 2.0 mols of an epoxide of the formula

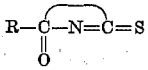

in which $R_1$ to $R_4$ stands for one of the combinations
 (1) each of $R_1$ to $R_4$ stands for hydrogen or an aliphatic group;
 (2) $R_1$ and $R_3$ are bound in a cycloaliphatic ring containing 6 carbon atoms;
 (3) $R_2$ and $R_4$ are bound in a cycloaliphatic ring containing 6 carbon atoms;
 (4) $R_1$ stands for an aryloxymethylene or an alkoxymethylene group and $R_2$, $R_3$ and $R_4$ each stands for hydrogen.

---

The products so produced, which constitute a part of the invention, are useful as insecticides and fungicides.

It has been found that 2-acylimino-1, 3-oxathiolanes can be made by heating carbacyl mustard oils of the general formula $$R-\underset{\underset{O}{\|}}{C}-N=C=S$$

in which R stands for methyl-, ethyl-, propyl-, isopropyl-, butyl-, isobutyl-, phenyl-, o-, m-, p-tolyl, or the ethoxy group with epoxides of the general formula

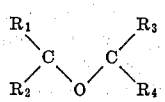

in which $R_1$ to $R_4$ represent hydrogen or aliphatic groups which $R_1$ is a lauryloxymethylene or allyloxymethylene group when $R_2$, $R_3$ and $R_4$ stand for hydrogen at a temperature of from 90 to 200° C.

Since the reaction of normal mustard oils with epoxides does not give any unitary product and the addition of epoxides to isocyanate proceeds in an entirely different way it was not to be expected that the foregoing reaction would give the 2-acylimino-1, 3-oxathiolanes.

The formation of the 2-acylimino-1, 3-oxathiolanes takes place by the addition of the epoxide to the C=S double bond of the carbacyl mustard oil according to the equation

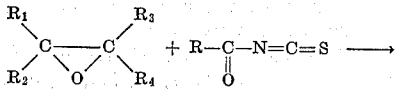

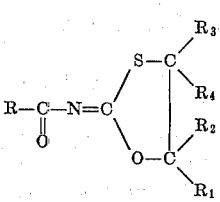

If $R_1$ and $R_2$ or $R_3$ and $R_4$ are both hydrogens the epoxide ring splits at the unsubstituted carbon atom so that the 5-substituted 2-acylimino-1, 3-oxathiolane is produced.

The reaction preferably is carried out with substantially equal molecular proportions of the carbacyl mustard oil and the epoxide but the molecular ratio may be varied within the range from 0.5 to 2 mol of the epoxide per mol of the acyl mustard oil.

It is advantageous to accelerate the reaction by the addition of a catalyst such as a halide of an alkali metal or an alkaline earth metal and preferably lithium chloride.

In general the reaction is carried out directly between the pure reactants but it can be carried out in the presence of polar solvents such as nitrobenzene, benzylcyanide or dimethylformamide and in such instances a tertiary amine such as pyridine, tributylamine or diethylamine, preferably pyridine, may be used as the catalyst.

In general the reaction is carried out at a temperature within the range from 90 to 180° C. and preferably at about 120° C, under an inert gas such as nitrogen.

The carbacyl mustard oil starting material for the process may be obtained by the reaction of a carboxylic acid chloride with salts of thiocyanic acid.

Examples of suitable carbacyl mustard oils are those of the general formula

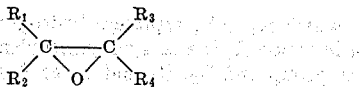

in which R stands for the methyl-, ethyl-, propyl-, isopropyl-, butyl-, isobutyl-, amyl-, isoamyl-, hexyl-, 2-ethylhexyl-, cyclohexyl-, cyclopentyl-, phenyl-, o-, m-, and p-tolyl-, o-, m-, and p-nitrophenyl-, o-, m-, and p-chlorophenyl-, 2, 3-dinitrophenyl-, 2, 4-dinitrophenyl, 2, 3-dichlorophenyl-, 3, 4-dichlorophenyl-, o-, m-, and p-methoxyphenyl-, o-, m-, and p-ethoxyphenyl, methoxy-, ethoxy- or propoxy- group.

Suitable epoxides for use in the process are ethylene oxide, 1, 2-propylene oxide, 1, 2-butylene oxide, tetramethylethylene oxide, 1, 2-octylene oxide, diisobutylene oxide, cyclohexene oxide, dimethylcyclohexene oxide and especially glycide ethers such as phenoxypropene oxide, methoxypropene oxide, ethoxypropene oxide, allylglycide ether and laurylglycide ether.

The 2-acylimino-1,3-oxathiolanes are very difficultly soluble in ether, may be dissolved and reprecipitated from methylene chloride-petroleum ether and recrystallized from ethanol. They generally form colorless and odorless crystals and may be decomposed by the action of an HCl-water-dioxan mixture into the corresponding acid amide and oxathiolane-2.

The 2-acylimino-1,3-oxathiolanes can be used for many purposes e.g. as insecticides and fungicides.

EXAMPLE 1

2-benzolimino-5-phenoxy-methyl-1,3-oxathiolane 16.2 g. (0.1 mol) of benzoyl mustard oil, 15 g. (0.1 mol) of phenoxypropene oxide and 42 mg. (1 mmol) of LiCl were heated together for 5 hours at 120° C. With a small amount of ether 13 g. (41.7% of theory) of colorless crystals having a melting point of 118–119° C. (from ethanol) was recovered.

Calc. for $C_{17}H_{15}NO_3S(313.3)$: C, 65.2; H, 4.8; N, 4.5; S, 10.2; O, 15.4. Found (308): C, 65.7; H, 5.4; N, 4.5; S, 10.2; O, 14.2.

EXAMPLE 2

2-(p-nitrobenzoyl)imino-5-phenoxymethyl-1,3-oxathiolane 10.4 g. (0.05 mol) of p-nitrobenzoyl mustard oil, 7.5 g. (0.05 mol) of phenoxypropene oxide and 21 mg. of LiCl (0.5 mmol) were heated together for 5 hours at 120° C. With a small amount of ether 5 g. (27.9% of theory) of light yellow crystals having a melting point of 131° C. (from ethanol) was recovered.

Calc. for $C_{17}H_{14}N_2O_5S(358.3)$: C, 56.9; H, 3.9; N, 7.8; S, 9.4; O, 22.0. Found (358): C, 57.0; H, 3.9; N, 7.8; S, 9.4; O, 21.9.

EXAMPLE 3

2-acetylimino-5-phenoxymethyl-1,3-oxathiolane 10 g. (0.1 mol) of acetyl mustard oil, 15 g. (0.1 mol) of phenoxypropene oxide and 42 mg. of LiCl were heated together at 120° C. for 5 hours. 22.6 g. of crude product was distilled giving a yield of 10.0 g. (44.4% of theory) of a product having a boiling point of 160–170° C. at 0.05 mm./Hg pressure. From ethanol with a small amount of ether colorless crystals having a melting point of 89–90° C. were recovered.

Calc. for $C_{12}H_{13}NO_3S(251.3)$: C, 57.7; H, 5.2; N, 5.6; S, 12.1; O, 19.4. Found (253): C, 57.7; H, 5.4; N, 5.7; S, 12.7; O, 18.5.

EXAMPLE 4

2-carbethoxyimino-5-phenoxymethyl-1,3-oxathiolane 13.2 g. (0.1 mol) of carbethoxyisothiocyanate, 15 g. (0.1 mol) of phenoxy-propene oxide and 42 mg. (1 mmol) of LiCl were heated together for 5 hours at 120° C. 22.1 g. of crude product was distilled giving a yield of 10.4 g. (47.0% of theory) of a product having a boiling point of 210–230° C. at 1 mm./Hg pressure. With a small amount of ether colorless crystals having a melting point of 84–85° C. (from ethanol) were obtained.

Calc. for $C_{13}H_{15}NO_4S(281.3)$: C, 55.6; H, 5.4; N, 5.0; S, 11.4; O, 22.6. Found (288): C, 55.5; H, 5.5; N, 5.0; S, 11.7; O, 22.3.

EXAMPLE 5

2-benzolimino-5-allyloxymethyl-1,3-oxathiolane 16.2 g. (0.1 mol) of benzoyl mustard oil, 11.4 g. (0.1 mol) of allylglycide ether and 42 mg. (1 mmol) of LiCl were heated together for 5 hours at 120° C. 23.9 g. of crude product was distilled giving a yield of 14.8 g. (62% of theory) of a product having a boiling point at 0.05 mm./Hg pressure of 180–185° C.

Calc. for $C_{14}H_{15}NO_3S(277.3)$: C, 60.8; H, 5.4; N, 5.1; S, 11.5; O, 17.2. Found (245): C, 61.7; H, 5.9; N, 5.3; S, 10.8; O, 16.3.

EXAMPLE 6

2-acetylimino-5-allyloxymethyl-1,3-oxathiolane 10 g. of (0.1 mol) of acetyl mustard oil, 11.4 g. (0.1 mol) of allylglycide ether and 42 mg. (1 mmol) of LiCl were heated together for 5 hours at 120° C. 17.5 g. of the resulting crude product was distilled. The yield was 6.7 g. (38.3% of theory) of a product having a boiling point of 97–100° C. at 0.01 mm./Hg pressure.

Calc. for $C_9H_{13}NO_3S(215)$: C, 50.3; H, 6.1; N, 6.5; S, 14.9; O, 22.2. Found (222): C, 51.0; H, 6.3; N, 7.0; S, 15.0; O, 20.7.

EXAMPLE 7

2-carbethoxyimino-5-allyloxymethyl-1,3-oxathiolane 13.2 g. (0.1 mol) of carbethoxyisothiocyanate, 11.4 g. (0.1 mol) of allylglycide ether and 42 mg. (1 mmol) of LiCl were heated together for 5 hours at 120° C. 21.4 g. of crude product was distilled. The yield was 8.6 g. (40.2% of theory) of a product having a boiling point of 163–165° C. at 0.05 mm./Hg pressure.

Calc. for $C_{10}H_{15}NO_4S(245.3)$: C, 49.0; H, 6.1; N, 5.7; S, 13.2; O, 26.0. Found (232): C, 50.2; H, 6.4; N, 5.9; S, 11.9; O, 25.6.

EXAMPLE 8

2-benzoylimino-5-methyl-1,3-oxathiolane 7.8 g. (0.048 mol) of benzoyl mustard oil, 2.8 g. (0.048 mol) of propylene oxide and 20 mg. of LiCl were heated together in an autoclave for 6 hours at 120° C. Distillation of the crude product gave 4.5 g. (42.5% of theory) of a product having a boiling range of 175–200° C. at 0.5 mm./Hg pressure and a melting point of 88–89° C. from ethanol.

Calc. for $C_{11}H_{11}NO_2S(221.3)$: C, 59.9; H, 5.0; N, 6.4; S, 14.5; O, 14.5. Found: C, 60.3; H, 5.7; N, 5.9; S, 14.2; O, 13.9.

EXAMPLE 9

2-carbethoxyimino-5-lauryloxymethyl-1,3-oxathiolane 6.6 g. (0.05 mol) of carbethoxyisothiocyanate, 12.1 g. (0.05 mol) of laurylglycide ether and 21 mg. (0.5 mmol) of LiCl were heated together for 8 hours at 120° C. 16.2 g. of crude product were distilled giving a yield of 7.7 g. (47.5% of theory) of a product having a boiling range of 190–220° C. at 0.1 mm./Hg pressure. From ethanol with a small amount of petroleum ether crystals having a melting point of 42–44° C. were produced.

Calc. for $C_{19}H_{35}NO_4S(373.6)$: C, 61.0; H, 9.4; N, 3.7; S, 8.7; O, 17.2. Found: C, 60.8; H, 9.4; N, 3.8; S, 8.8; O, 17.2.

We claim:

1. Process for the production of a 2-acylimino-1,3-oxathiolane which comprises heating a mixture of a carbacyl mustard oil of the formula

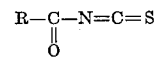

in which R stands for a member selected from the group consisting of methyl-, ethyl- propyl-, isopropyl-, butyl-, isobutyl-, phenyl-, o-, m-, p-tolyl and ethoxy groups and an epoxide of the formula

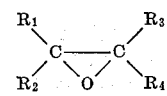

in which $R_1$ to $R_4$ represent hydrogen or aliphatic groups or in which $R_1$ is a lauryloxymethylene or allyloxymethylene group and $R_2$, $R_3$ and $R_4$ each stands for hydrogen, in a molecular ratio within the range from 0.5 to 2 mols of epoxide per mol of acyl mustard oil at a temperature within the range from 90 to 200° C.

2. Process as defined in claim 1 in which the mixture is heated in the presence of a halide of a metal selected from the group consisting of the alkali metals and the alkaline earth metals.

3. Process as defined in claim 1 in which the mixture of substantially equal molecular proportions of the carbacyl mustard oil and the epoxide is heated at about 120° C. for about 5 hours in the presence of LiCl in an atmosphere of nitrogen.

4. 2-acylimino-1,3-oxathiolanes of the general formula

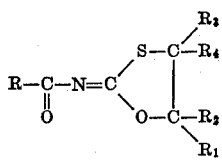

in which R stands for the methyl-, ethyl-, propyl-, isopropyl-, butyl-, isobutyl-, phenyl,- o-, m-, p-tolyl, or an ethoxy-group, and in which $R_1$ to $R_4$ represent hydrogen or the methyl-, ethyl-, propyl-, isopropyl-, butyl-, isobutyl-, amyl-, isoamyl-group or in which $R_1$ and $R_3$ are bound in a cycloaliphatic ring when $R_2$ and $R_4$ are hydrogen or in which $R_1$ is an alkoxymethylene group when $R_2$, $R_3$ and $R_4$ stand for hydrogen.

5. 2-benzoylimino-5-phenoxy-methyl-1,3-oxathiolane.
6. 2-(p-nitrobenzoyl)-imino - 5 - phenoxymethyl - 1,3-oxathiolane.
7. 2-acetylimino-5-phenoxymethyl-1,3-oxathiolane.
8. 2 - carbethoxy - imino - 5 - phenoxymethyl - 1,3-oxathiolane.
9. 2-benzoylimino-5-allyloxymethyl-1,3-oxathiolane.
10. 2-acetylimino-5-allyloxymethyl-1,3-oxathiolane.
11. 2 - carbethoxy - imino - 5 - allyloxymethyl - 1,3-oxathiolane.
12. 2-benzoylimino-5-methyl-1,3-oxathiolane.

References Cited

Grobov et al.: Russian Chem. Reviews (September 1966), pp. 671–3.
Price et al.: Jour. Amer. Chem. Soc., vol. 75 (1953), pp. 2396–2400.

JAMES A PATTEN, Primary Examiner

U.S. Cl. X.R.
260—463, 545, 999

UNITED STATES PATENT OFFICE
CERTIFICATE OF CORRECTION

Patent No. 3,480,647                              November 25, 1969

Roland Feinauer et al.

It is certified that error appears in the above identified patent and that said Letters Patent are hereby corrected as shown below:

Column 5, line 1, beginning with "2-acylimino-1," cancel all to and including "for hydrogen" in line 16, and insert instead -- 2-carbethoxyimino-5-lauryloxymethyl-1,3-oxathiolane --.

Signed and sealed this 20th day of October 1970.

(SEAL)
Attest:

Edward M. Fletcher, Jr.                       WILLIAM E. SCHUYLER, JR.
Attesting Officer                                    Commissioner of Patents